United States Patent [19]

Mauch

[11] Patent Number: 5,730,344
[45] Date of Patent: Mar. 24, 1998

[54] FOOD SERVER FOR RECREATIONAL VEHICLES

[75] Inventor: Donald A. Mauch, Halifax, Mass.

[73] Assignee: Seve Manufacturing, Inc., Halifax, Mass.

[21] Appl. No.: 642,568

[22] Filed: May 3, 1996

[51] Int. Cl.[6] .................................................. B60R 9/055
[52] U.S. Cl. ........................ 224/402; 224/404; 220/333; 312/405
[58] Field of Search ........................ 224/402, 404, 224/282, 522, 42.32; 312/405, 405.1, 327, 328; 190/4, 12 A, 112, 111, 119; 220/333, 329; 62/457.7, 457.5

[56] References Cited

U.S. PATENT DOCUMENTS

| | | |
|---|---|---|
| 1,109,734 | 9/1914 | Bauer . |
| 1,336,776 | 4/1920 | Drinkwater . |
| 1,577,745 | 3/1926 | Grider . |
| 1,987,448 | 1/1935 | Pearson ............... 312/328 X |
| 2,332,760 | 10/1943 | Smallen . |
| 2,499,254 | 2/1950 | Parker . |
| 3,979,007 | 9/1976 | Thornbloom, Jr. ............... 220/23 |
| 4,266,821 | 5/1981 | Gillet ............... 224/404 X |
| 4,391,386 | 7/1983 | Moret ............... 220/343 |
| 4,515,421 | 5/1985 | Steffes ............... 62/457.7 X |
| 4,635,992 | 1/1987 | Hamilton et al. ............... 296/37.6 |
| 4,889,257 | 12/1989 | Steffes ............... 220/331 |
| 5,065,922 | 11/1991 | Harris ............... 224/901.8 |
| 5,299,722 | 4/1994 | Cheney ............... 224/273 |
| 5,437,165 | 8/1995 | White et al. ............... 62/457.7 X |
| 5,498,049 | 3/1996 | Schlachter ............... 224/404 X |
| 5,518,158 | 5/1996 | Matlack ............... 224/402 |

*Primary Examiner*—Renee S. Luebke
*Attorney, Agent, or Firm*—Lahive & Cockfield, LLP

[57] ABSTRACT

A chest for storing, carrying and serving foodstuffs specifically designed for use in conjunction with recreational activities such as tailgating. The chest includes five rigid walls defining a volume of storage space and a unique cover moveable between an open and closed position relative to the five rigid walls. The cover is pivotally mounted to one of the rigid walls and is formed of a plurality of sectional parts pivotally attached to one another. The chest also includes compartments designed for holding various items and containers. The chest can be removably and replaceably secured to the tailgate of a vehicle using a mounting structure.

7 Claims, 6 Drawing Sheets

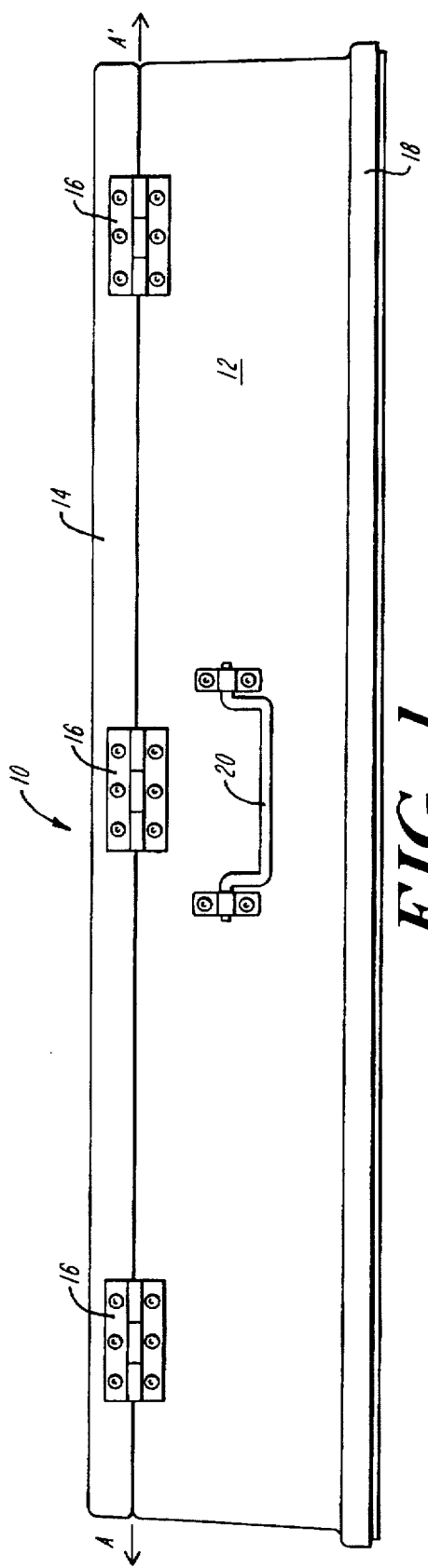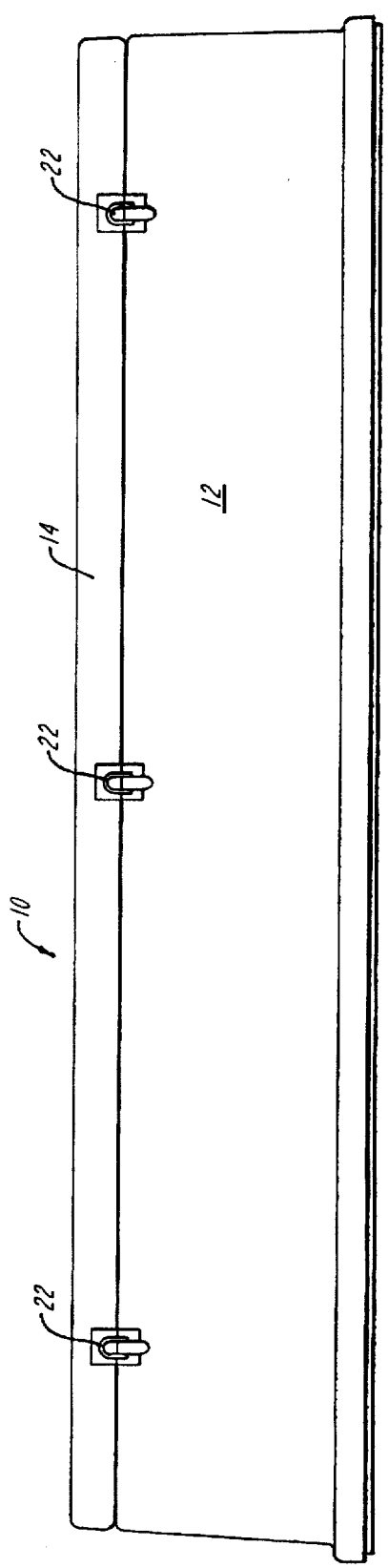

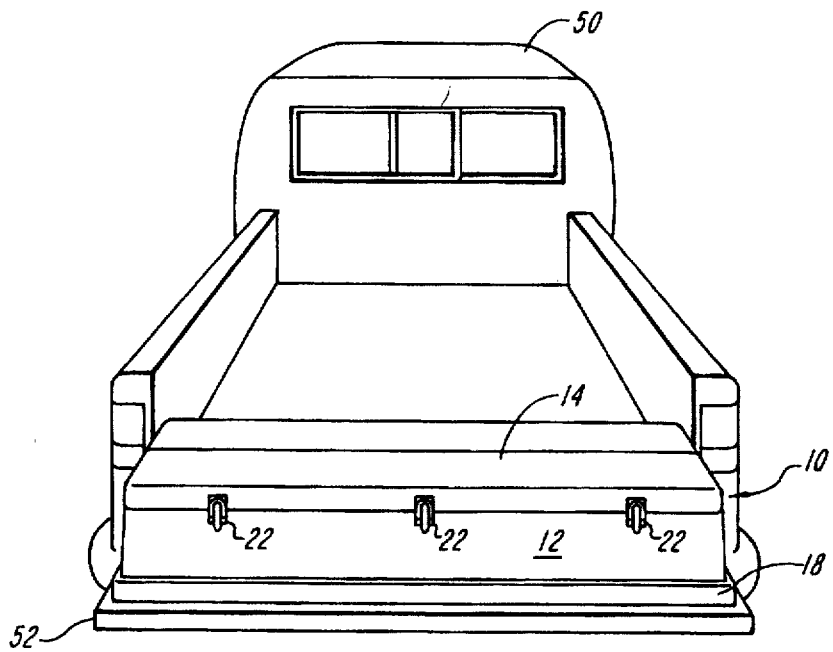
FIG. 8
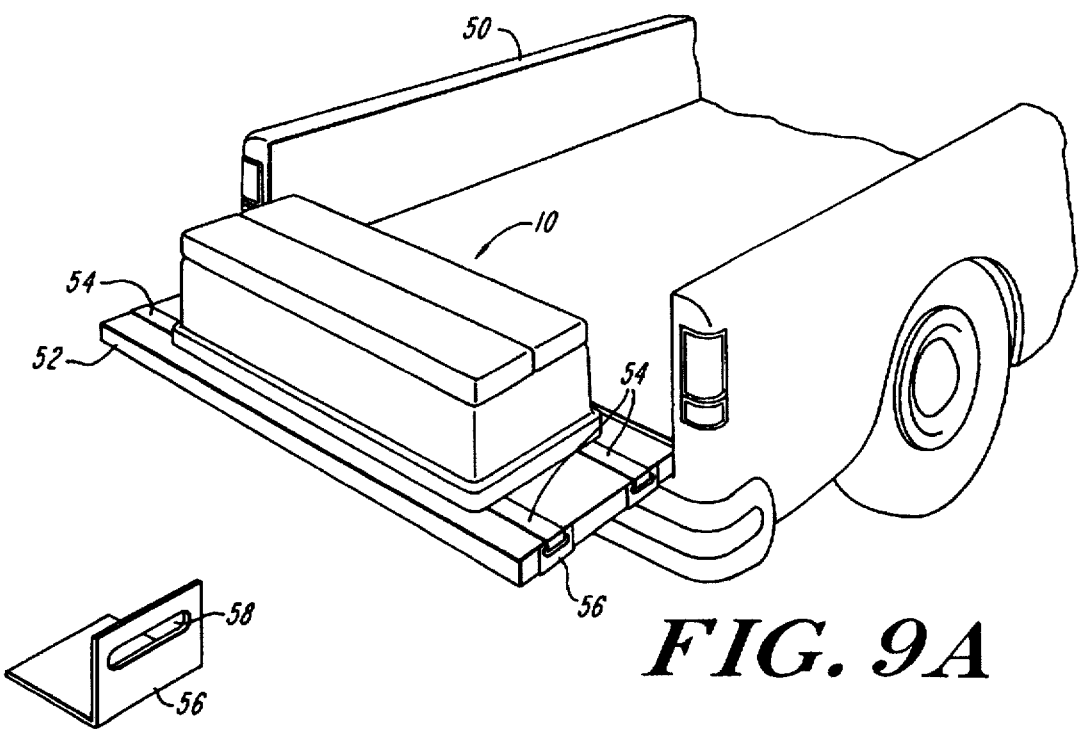
FIG. 9A
FIG. 9B

5,730,344

1

FOOD SERVER FOR RECREATIONAL VEHICLES

BACKGROUND OF THE INVENTION

The present invention relates to storage chests for holding foodstuffs and related items. More specifically, the invention provides for a storage device having features that offer convenient, organized, and level ways to store and serve foodstuffs, particularly for use with vehicles in recreational settings, and the invention provides for a storage device capable of retaining items in relatively static positions regardless of the positional orientation of the storage device and the invention Prior storage units known in the art include coolers having an open box and a cover connected to the open box. The box and cover form an enclosed volume of space when the cover is moved to the closed position, and the open box forms a structure capable of receiving items or having items removed therefrom when the cover is moved to the open position.

Coolers, however, suffer from the lack of compartmentalized spaces designed for storing specific items. Items placed within coolers tend to shift and possibly rupture when the cooler is moved. In addition, known coolers only include single piece covers that fail to provide additional storage space when the cover is in the closed position or serving space when the cover is in the open position.

Other storage units known in the art are designed for positioning between the cab of a pickup truck and a camper attached to the pickup truck, as described in various patents issued to Milton R. Hathaway, Jr., including U.S. Pat. Nos. 3,767,252; 3,729,224; and 3,638,991. These storage units typically occupy the small spaces created between the cab of a pickup truck and the attached camper. The storage units open onto either or both the cab and the attached camper, and provide a volume of accessible storage space fitting into the interstices between the cab and camper.

Storage units designed for fitting between the cab of a pickup truck and the attached camper typically do not contain compartmentalized spaced designed for storage and do not provide a level surface for serving food and beverages. Another drawback of these storage units is that they do not fully utilize the doors or covers that close off the storage volume located between the cab and camper. Furthermore, because these storage units are not designed to be removeably or replaceably mounted between the cab and camper, they can not be removed so that items can be easily loaded and unloaded from the storage unit.

Another type of storage unit is described in Bauer, U.S. Pat. No. 1,109,734. Bauer describes an extensible-table chest adapted for use when making trips in automobiles or carriages. The extensible-table chest includes a cover with a table like extension. The table like extension, however, requires an extendible leg for support.

SUMMARY OF THE INVENTION

Accordingly, it is an object of the invention to provide an improved food server designed for use with recreational activities such as tailgating. The food server includes a chest defining a volume of storage space and structural elements defining various serving surfaces. In addition, the food server can further comprise a unique cover formed of a plurality of sectional parts pivotally attached to one another, such that the sectional parts can act as serving surfaces. Other aspects of the food server provide for a chest having a compartmentalized volume of storage space capable of holding containers stored within the chest in a relatively static position.

A principal aspect of the invention provides for a chest structure formed of five walls defining a volume of space, a cover formed of a plurality of partitions, and compartments mounted within the chest structure for holding items substantially static during different positional orientations of the chest. The partitions forming the cover are pivotally connected together and one of the partitions is pivotally mounted to the chest to allow the cover to move between an open and a closed position. The structural connections between the partitions allow at least one of the partitions to be oriented substantially parallel to the opening in the chest when the cover is in its open position.

BRIEF DESCRIPTION OF THE DRAWINGS

These and other features of the invention will be understood from the following disclosure, the teachings of which will be read in light of the background technology as understood by a person of ordinary skill in the art, and the illustrations of representative embodiments, wherein:

FIG. 1 illustrates a rear elevation view of a chest according to the invention;

FIG. 2 shows a front elevation view of the chest illustrated in FIG. 1;

FIG. 8 illustrates the chest shown in FIG. 2 mounted on the tailgate of a truck; and FIGS. 9A and 9B illustrate mechanisms for mounting the chest shown in FIG. 2 to the tailgate of a truck.

DETAILED DESCRIPTION OF THE INVENTION

Figure 3:
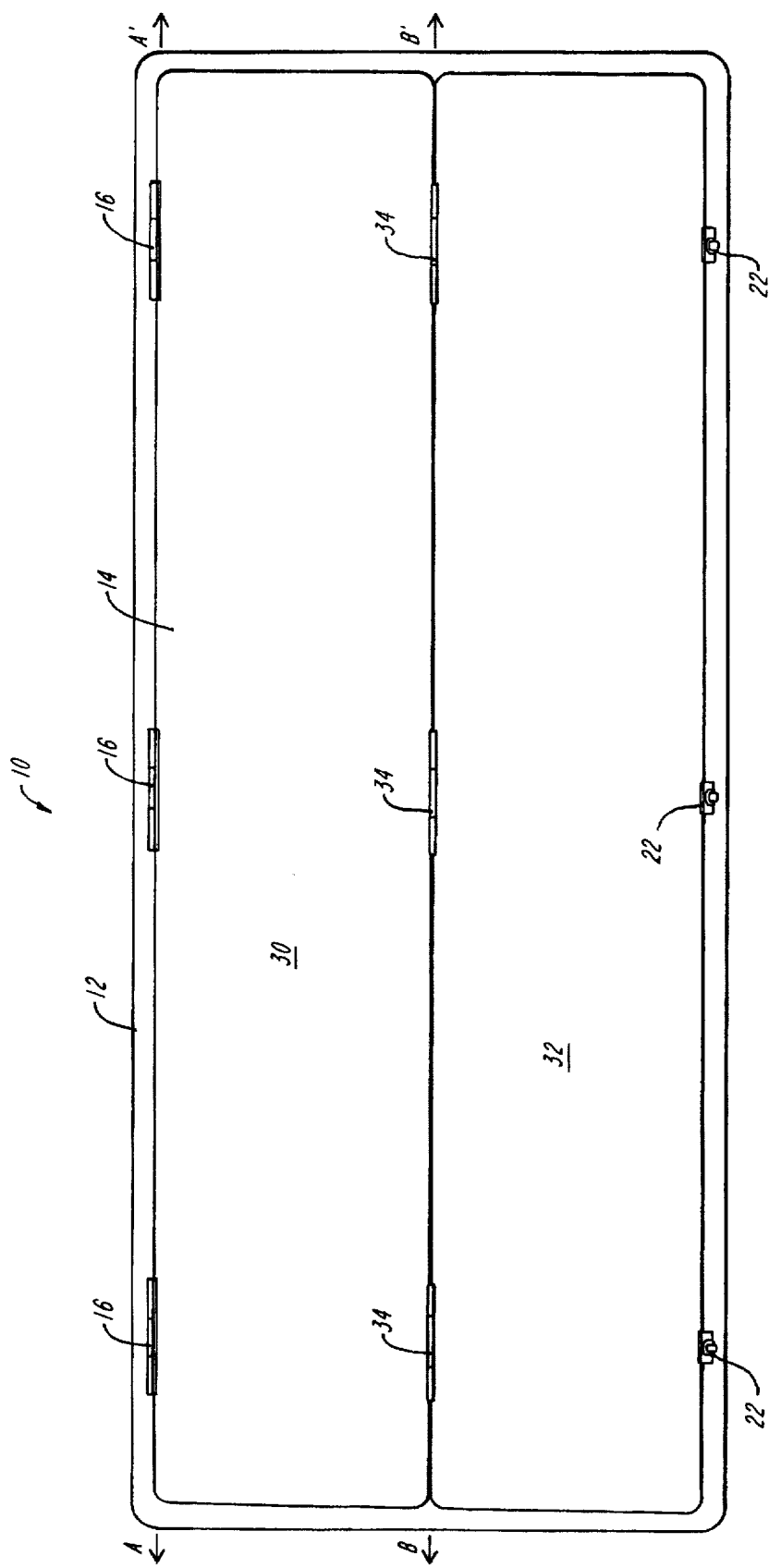
FIG. 3 shows a top view of the chest shown in FIG. 1.

FIG. 1 shows a rear view of a chest 10 for carrying food and drink. The chest 10 includes five rigid and typically rectangular walls enclosing a volume of space. One of the five rigid walls forms a rectangular base 18 and the other four walls form side walls 12 that rise from the base 18 to form a closed structure having an opening opposing the base 18. Accordingly, the bottom of the chest 10 is closed by the base 18 and the top of the chest 10 remains open. Cover 14 can be used in one position to close the open top and in another position to leave the top open. Typically the five walls are arranged to remain interconnected forming a box.

According to one aspect of the invention, one or more of the base 18, the side walls 12, and the cover 14 are formed of a thermally insulating structure that protects foodstuffs stored within the chest 10 from changes in exterior temperatures. The insulating structure can include a double-walled structure having a vacuum between the walls that reduces heat transfer through the insulating structure. The walls of the chest can be formed of a plastic, such as a polyethylene plastic. For example, the base, side walls, and cover can be formed of polypropylene.

The cover 14 is pivotally mounted to one of the side walls 12 with first connecting elements 16. For example, the connecting element 16 allows the cover 14 to pivot around axis A-A' of FIG. 1. The first connecting elements can be formed of hinges, joints, bearings, springs, screws, or any other structures known in the art that provide pivotal connections. Preferably, the cover 14 is mounted to the sidewall 12 using a plurality of hinges 16.

FIG. 1 further illustrates the chest 10 having a carrying element 20. The carrying element is attached to the chest 10 to aid in moving the chest from one location to another. The carrying element is a design feature of the invention that enables the chest to be moved from one location to another to aid in loading and unloading the chest. For instance, the chest can be loaded with items and then moved to the tailgate of a vehicle where it will be secured. The carrying element is typically a moveable handle affixed to one of the sidewalls 12 of the chest 10.

FIG. 2 illustrates a front view of the chest 10 having latching elements 22 for holding the cover 14 in a closed position. The latching elements can be formed of any latching mechanism known in the art, including: fasteners, clamps, hold downs, VELCRO, or snaps.

FIG. 3 illustrates a top view of the storage device. The illustrated cover 14 is shown in the closed position, such that it substantially covers the opening in the top of the chest 10. FIG. 3 also shows that the cover 14 includes a first portion 30 and a second portion 32. The first and second portions 30, 32 forming the cover are pivotally connected together by second connecting elements 34. For example, the second connecting elements 34 allow the second portion 32 to rotate about the axis B-B' relative to the first portion 30. The second connecting elements can be formed of hinges, joints, bearings, springs, screws, or any other structures known in the art that provide pivotal connections. Preferably, the first portion 30 connects with the second portion 32 using a plurality of hinges.

Figure 4:
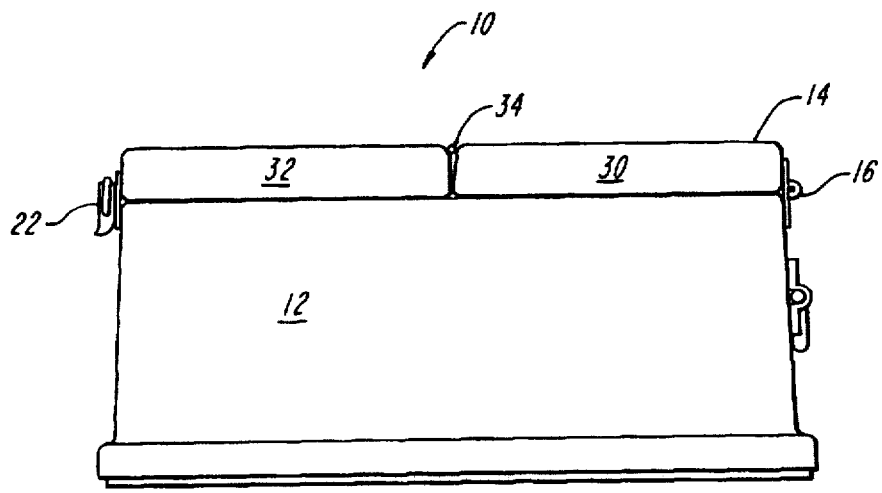
FIG. 4 shows a side elevation view of the chest of FIG. 1 having the cover in the closed position.
Figure 5:
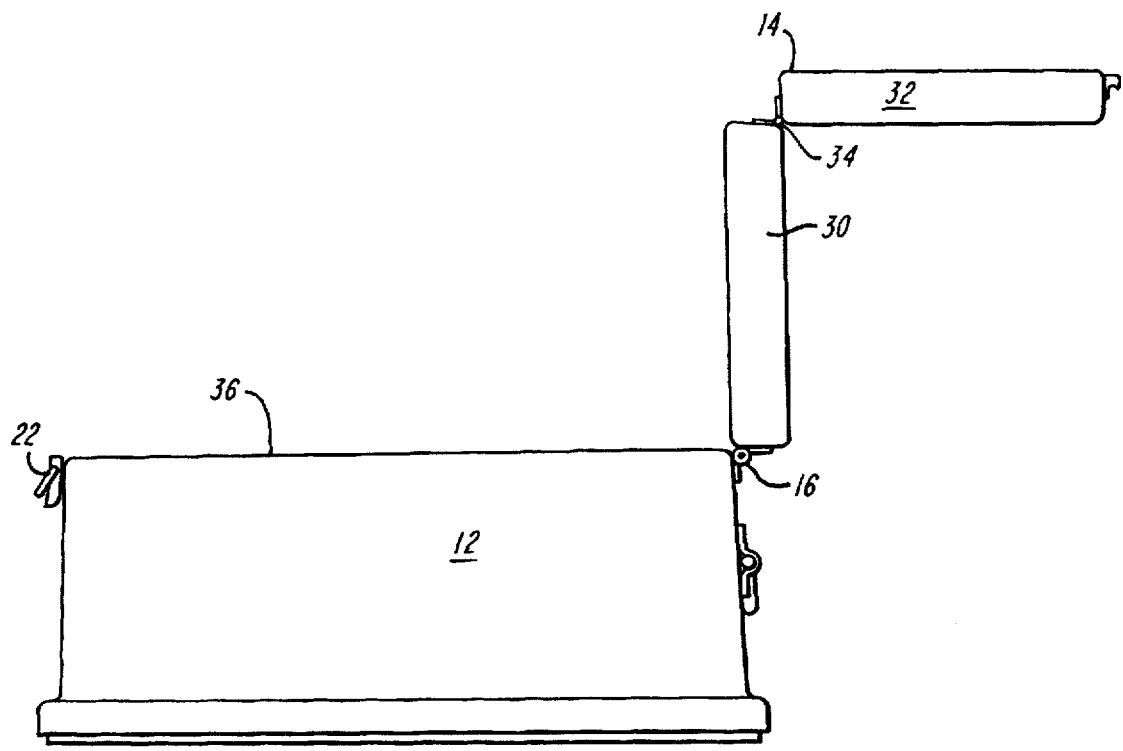
FIG. 5 shows a side elevation view of the chest of FIG. 1 having the cover in the open position.

FIGS. 4 and 5 show side views of the chest 10. FIG. 4 illustrates the chest 10 having the cover 14 in the fully closed position and FIG. 5 illustrates the chest having the cover 14 in the fully open position. With further reference to FIG. 5, the first portion 30 is shown supporting the second portion 32 when the cover is in the open position. More particularly, the second portion 32 is supported such that the second portion is substantially parallel to the top opening 36 of the chest 10.

FIGS. 4 and 5 additionally illustrate the pivotal operation of the first and second connecting elements 16, 34. As shown, the cover 14 is rotatable in a clockwise direction around an axis of the connecting element 16 to move from a closed position to an open position, and the cover 14 is rotatable in a counter-clockwise direction around an axis of the connecting element 16 to move from an open position to a closed position. The second portion 32 of the cover 14 is rotatable in a clockwise direction around an axis of the connecting element 34 such that the second portion 32 is oriented substantially perpendicular to the first portion 30, and the cover 14 is rotatable in a counter-clockwise direction around an axis of the connecting element 34 such that the second portion is oriented substantially parallel to the first portion 30. When the cover 14 is moved to the open position and when the second portion is rotated clockwise relative to the second portion, the first portion 30 supports the second portion 32 and the second portion 32 is oriented substantially parallel to the opening 36.

In accordance with one aspect of the invention, the first connecting element 16 allows the cover 14 to pivot about axis A-A' of FIG. 3 up to 90 degrees. Additionally, the second connecting element 34 can be designed such that the second portion pivots about axis B-B' of FIG. 3, relative to the first portion, up to 90 degrees. This aspect of the invention limits the range of rotation of the first and second connecting elements to 0–90 degrees such that the first and second connecting elements cause the second portion 32 of the cover to act as a serving or shelving space.

In particular, when the first connecting element 16 is prevented from exceeding a 90 degree rotation, the first portion 30 of the cover is aligned substantially perpendicular to the opening 36 when the cover is in the fully opened position. Furthermore, when the second connecting element is prevented from exceeding a 90 degree rotation, the second portion 32 is aligned substantially parallel to the opening 36 when the cover is fully opened and when the second portion is fully rotated. This allows the first portion 30 of the cover to support the second portion 32 of the cover, and this allows the second portion to provide added serving space. A 90 degree hinge can be used to form connecting elements 16 and 34 that are limited to 90 degrees of rotation.

Having a cover 14 divided into at least two portions, i.e. the first portion 30 and the second portion 32, advantageously forms a storing chest 10 easily adaptable to a variety of vehicles. For example, automotive vehicles having liftbacks or bi-panel doors, instead of tailgates, do not provide the added clearance necessary to accommodate a cover lacking a plurality of portions.

Vehicles having liftbacks or bi-panel doors typically have a limited distance from the rear opening of the vehicle to obstructions located in the rear of the vehicles, such as rear wheel wells, rear seats, and spare tires. Accordingly, when a chest, mounted in one of these vehicles, has a cover 14 rotated to the fully opened position, the cover 14 may interfere with an obstruction in the rear of the vehicle. If the cover rests on the obstruction when opened, the cover will not form a level serving surface and rather the cover will be positioned at an angle determined by the height of the obstruction relative to the height of the chest 10. To prevent this interference between the cover and the obstruction, the invention disclosed herein includes a plurality of portions forming the cover. These inventive aspects of the cover 14 allow the first portion to elevate the second portion of the cover above the height of an obstruction in the rear of the vehicle, and these inventive aspects allow the second elevated portion to serve as a serving surface.

Moreover, the use of a cover having a plurality of portions maximizes the utilization of storage space in these type of vehicles by providing for a chest having a footprint that utilizes substantially all the volume in the rear of the vehicle while providing a cover capable of being fully opened. Furthermore, the use of a multi-part cover (i.e. a cover having a plurality of portions) also minimizes the reach from the rear opening in a vehicle to the serving spaces associated with the chest because the multi-part cover raises the serving surfaces associated with the fully opened and rotated portions of the cover. The serving surfaces created by the multi-part cover also form multi-level serving surfaces that keep utensils, cups, containers and other items located on the second portion 32 of the cover up and out of the way of various foods stuffs located within the volume of space defined by the walls 12 and bottom 18 of the chest 10.

Figure 6:
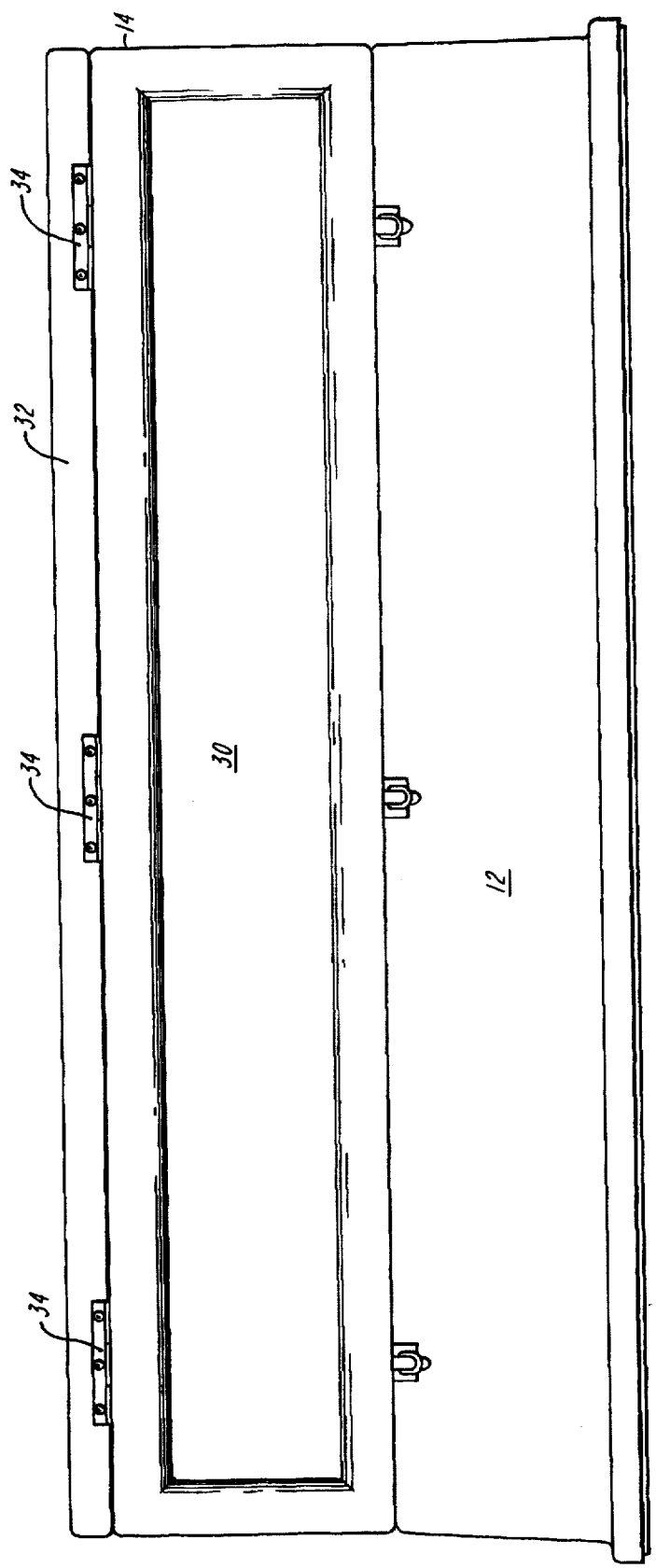
FIG. 6 illustrates the chest of FIG. 2 having the cover in the open position.

FIG. 6 shows a frontal view of the chest 10 having the cover 14 in the open position. The first portion of the cover 30 is shown supporting the second portion of the cover 32.

Figure 7:
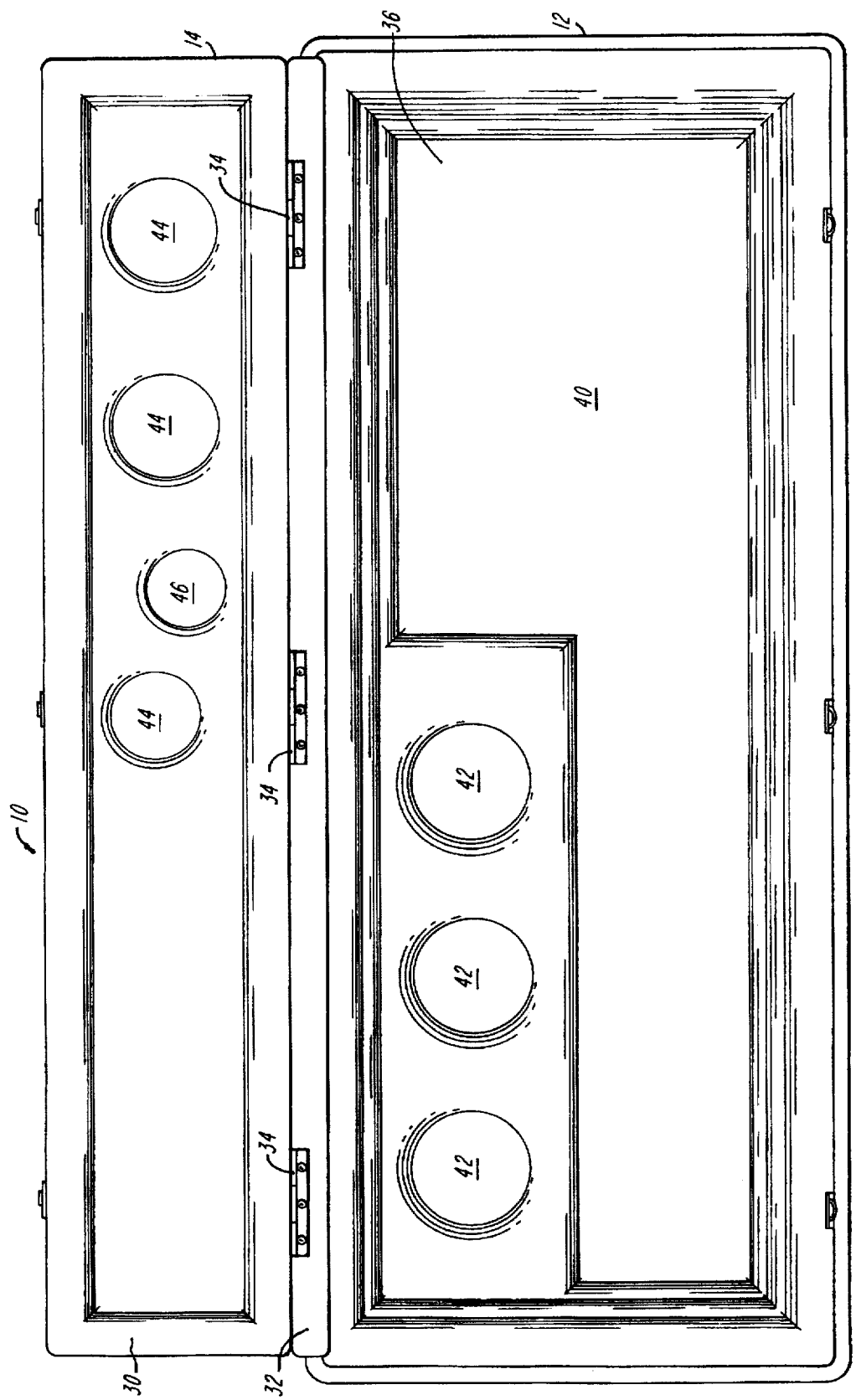
FIG. 7 illustrates a top view of the chest shown in FIG. 2 having the cover in the open position.

FIG. 7 illustrates a top view of the chest 10 with the cover 14 in the open position and with the second portion 32 of the cover fully rotated in the clockwise direction relative to the first portion 30 of the cover. The chest 10 is shown including a plurality of compartments and a plurality of retaining elements. In particular, the illustrated chest 10 is shown having first compartment 40, second compartments 42, first retaining elements 44 and second retaining elements 46.

The compartments 40 and 42 are preformed spaces within the volume of space formed by the base 18 and the sidewalls 12. The compartments can hold containers or foodstuffs within the chest 10 such that the containers remain within their respective compartments while the chest 10 is moved between a variety of different positional orientations. For instance, compartment 2 can be formed to hold 2 cup round, plastic food storage containers with covers, and compartment 40 can be formed to hold a wooden cutting board and two 3.6 quart rectangular food storage containers with covers.

In addition, the compartments 40 and 42 can be fashioned to prevent the shifting and opening of containers stored within the chest 10. One feature of the invention may include a cover matching the general outline of the compartments. This causes the containers, when the cover is closed, to remain in their respective compartments irrespective of the positional orientations of the chest 10. Other features of the invention can provide for containers that removably and replaceably attach to the compartments 40, 42. The removable and replaceable containers can be removed for easy cleaning or loading, and the containers can be mounted to the inside of the chest 10.

Retaining elements 44 and 46 are preformed depressions in the second portion 30 of the cover 14. The retaining elements act to hold containers in place when the second portion 30 is in the fully deployed position, i.e. when the second portion 30 is positioned substantially parallel to the opening 36. For example, when the second portion is fully deployed, the elements 44 and 46 in the second portion acts as a shelf for supporting and serving various containers. Because the retaining elements 44 and 46 constitute depressions in the second portion, the containers do not slide across the second portion.

In addition to the compartments and the retaining elements, the chest 12 can include a mesh (not shown) fashioned to the first portion 32. The mesh provides additional storage area. Preferably, the mesh is flexible so that objects can be inserted into the space formed between the mesh and the first portion 32. The elasticity of the mesh applied against the first portion 32 holds the objects in place as the chest is moved.

According to a further aspect of the invention, the chest 10 is mounted to a tailgate 52 of a vehicle 50, as shown in FIG. 8. The chest can be mounted in a manner providing easy access to containers stored within the chest when the tailgate is in the down position, and providing a secure environment for containers within the chest when the tailgate is in the up position. In particular, the chest 10 is mounted to tailgate 52 with the bottom 18 adjacent the tailgate and with the cover 14 distal from the tailgate. Accordingly, when the tailgate is in the down position, the cover is easily accessible. This allows the cover to be opened, thereby providing access to containers held within the chest 10. In addition, the first and second portions of the cover can be fully deployed to provide a shelf for holding drinks and containers when the tailgate is in the down position. Later, containers can be returned to the chest 10, and the cover 14 can be lowered and secured with latching elements 22. Once the chest 10 is secured, the tailgate 52 can be returned to the raised position with the chest still attached thereto.

Other features of the invention include providing a bottom 18 of the chest having a non-slip surface. Additionally, the bottom 18 can be formed of scratch and abrasion resistant materials. The chest preferably has a non-slip surface to aid in securing the chest 10 to the tailgate 52, and the scratch and abrasion resistant characteristics of the bottom 18 aid in preventing damage to the chest 10 or the tailgate 50 due to the physical contact with adjoining surfaces.

FIG. 9A shows a further feature of the invention including a mounting element 54 for securing the chest 10 to the tailgate 52. The mounting element secures the chest to any of a variety of automobiles, including: pickup trucks, sport utility vehicles, minivans, and automobiles having tailgates, liftbacks, combination tailgate/liftbacks and bi-panel doors. For example, the mounting element can be formed of one or more elastic straps having sufficient tension to hold the chest 10 to the tailgate 52. Alternatively, the mounting element can be formed of one or more substantially non-elastic straps having a tension adjusting mechanism. In either case, the mounting element 54 removably and replaceably holds the chest 10 to the tailgate 52.

FIG. 9B illustrates an enlarged view of a mounting bracket 56. The mounting bracket can be attached to the mounting element 54 to provide added strength for securing the chest 10 to the tailgate 52 illustrated in FIG. 9. Typically, the mounting element 54 can be attached to the mounting bracket 56 by securing the mounting element 54 to the hole 58 in bracket 56. Bracket 56 is then cornered against the underside of tailgate 52 such that tension applied by the mounting element 54 secures the chest to the tailgate. Another feature of the invention utilizes a mounting bracket having a non-scratch surface. The non-scratch surface can be formed of a plastic and prevents the bracket from marring the surface of tailgate 52.

The invention being thus disclosed and described in connection with the illustrated embodiments, variations and modifications thereof will occur to those skilled in the art, and are intended to be included within the scope of the invention, as defined by the claims appended hereto.

What is claimed is:

1. A chest for storing, carrying and serving food and drink comprising, five rigid and generally rectangular walls enclosing a volume and having an open top, a cover for enclosing the open top of said chest, a compartment structure mounted within said volume adapted to hold food and drink containers of various shapes such that said containers remain within said compartments for a variety of different positional orientations of said chest, when said cover is enclosing the open top of said chest, said cover being formed of at least a first and a second portion cooperating to overlay the open top of said chest, said two-portions being pivotally connected to one another, said first portion being pivotally mounted on said walls such that said cover can be pivoted from a closed position to an open position to expose the interior of said chest, the first of said cover portions serving as a support for the second of said portions when said cover is in its open position to support the second of said portions in a position parallel to the open top of said chest, said second portion formed with surface retaining elements, which are exposed when said cover is in the open position, said retaining elements being suitable for holding food and drink containers.

2. A chest in accordance with claim 1 wherein said walls are formed of thermally insulating material.

3. A chest in accordance with claim 1 wherein said generally rectangular wall opposite said open top is provided with a gripping surface for adhering to a mounting surface.

4. A chest in accordance with claim 1 and further including a latch means to hold said cover in place closing the open top of said chest, irrespective of the positional orientation of said chest.

5. A chest in accordance with claim 1, wherein said first and second portions of said cover form a generally planar element when said cover is in its closed position.

6. A chest for storing, carrying and serving food and drink comprising,

- five rigid and generally rectangular walls enclosing a volume and having an open top,
- a cover for enclosing the open top of said chest,
- a compartment structure mounted within said volume adapted to hold food and drink containers of various shapes such that said containers remain within said compartments for a variety of different positional orientations of said chest, when said cover is enclosing the open top of said chest,
- said cover being formed of at least a first and a second portion, said two-portions being pivotally connected to one another, said first portion being pivotally mounted on said walls such that said cover can be pivoted from a closed position to an open position to expose the interior of said chest, the first of said cover portions serving as a support for the second of said portions when said cover is in its open position to support the second of said portions in a position parallel to the open top of said chest, said second portion formed with surface retaining elements, which are exposed when said cover is in the open position, said retaining elements being suitable for holding food and drink containers, and
- wherein said first and second cover portions are connected by at least one hinge element, said cover being pivotally mounted on said walls by at least one hinge element, said hinge elements being formed such that when said cover is in a closed position enclosing the top of said chest, said first and second portions form a generally planar element and when said first and second cover portions are in an open position, said first cover portion provides a vertical support for maintaining said second portion in a plane parallel to the open top of said chest.

7. A chest with an open top for mounting on a tail gate of a vehicle, said tail gate being moveable approximately 90° between an up position and a down position where said tail gate extends beyond the body of said vehicle, the improvement comprising, a cover for enclosing the open top of said chest and fasteners for holding said chest in position on said tail gate such that when said tail gate is in the down position said chest is oriented with the open top parallel to the plane of said tail gate providing convenient access to the interior of said chest, and when said tail gate is in the up position said chest is fastened to said tail gate such that the open top, enclosed by said cover, remains parallel to the plane of said tail gate, wherein said chest is provided when said tail gate is in the down position with an open top and said chest extends beyond the body of said vehicle for convenient access to said chest, said cover providing a serving surface, and when said tail gate is up, said chest is located entirely within the body of said vehicle.

* * * * *